(12) United States Patent
Bardman et al.

(10) Patent No.: US 9,234,084 B2
(45) Date of Patent: Jan. 12, 2016

(54) POLYMER ENCAPSULATED TITANIUM DIOXIDE PARTICLES

(75) Inventors: James Keith Bardman, Green Lane, PA (US); Karl Allen Bromm, Forest Grove, PA (US)

(73) Assignee: Rohm and Haas Company, Philadelphia, PA (US)

( * ) Notice: Subject to any disclaimer, the term of this patent is extended or adjusted under 35 U.S.C. 154(b) by 127 days.

(21) Appl. No.: 14/000,444

(22) PCT Filed: Feb. 22, 2012

(86) PCT No.: PCT/US2012/026047
§ 371 (c)(1),
(2), (4) Date: Sep. 20, 2013

(87) PCT Pub. No.: WO2012/116025
PCT Pub. Date: Aug. 30, 2012

(65) Prior Publication Data
US 2014/0011943 A1  Jan. 9, 2014

Related U.S. Application Data

(60) Provisional application No. 61/490,126, filed on May 26, 2011, provisional application No. 61/463,782, filed on Feb. 23, 2011.

(51) Int. Cl.
*C09C 1/36* (2006.01)
*C08K 3/22* (2006.01)
*C08L 33/08* (2006.01)

(52) U.S. Cl.
CPC . *C08K 3/22* (2013.01); *C08L 33/08* (2013.01); *C09C 1/3676* (2013.01)

(58) Field of Classification Search
CPC .......... C08K 3/22; C09C 1/3676; C08L 33/08
USPC ....................................... 524/521, 817, 833
See application file for complete search history.

(56) References Cited

U.S. PATENT DOCUMENTS

2007/0112503 A1   5/2007  Johnson et al.
2010/0298483 A1*  11/2010 Allen et al. ................... 524/497

* cited by examiner

*Primary Examiner* — Kelechi Egwim
(74) *Attorney, Agent, or Firm* — Reid S. Willis

(57) ABSTRACT

The present invention relates an aqueous dispersion of low $T_g$ polymer encapsulating $TiO_2$ particles and a process for preparing the dispersion. The encapsulating polymer is a (meth)acrylate polymer, a styrene-acrylate copolymer, or a vinyl acetate-(meth)acrylate copolymer, or a combination thereof, and the encapsulating polymer further contains units of sodium styrene sulfonate. The present invention provides encapsulated $TiO_2$ particles with low gel that are film-forming at ambient temperatures, especially for coatings applications.

11 Claims, No Drawings

POLYMER ENCAPSULATED TITANIUM DIOXIDE PARTICLES

BACKGROUND OF THE INVENTION

The present invention relates to an aqueous dispersion of polymer encapsulated $TiO_2$ particles and a process for preparing them. This dispersion is useful for plastics and coatings formulations.

Opacifying pigments such as $TiO_2$ provide opacity (hiding) for coatings and for plastics to conceal the undersurface. It is believed that the efficiency of the pigment is related to the spacing of the pigment particles in the coating or plastic. Improvements in spacing can be achieved, for example, by using sulfur acid-functional polymers as dispersants for the pigments in combination with other polymers that at least partially encapsulate the pigment, as disclosed in US Pat. Pub 20100/298483. It would be desirable to find improved opacifying pigment compositions and more efficient ways of making them.

SUMMARY OF THE INVENTION

In a first aspect, the present invention is a process comprising the steps of:
a. contacting a mixture of i) an aqueous dispersion of $TiO_2$ particles and an amphoteric polymer; ii) an anionic surfactant; and iii) an aqueous solution of sodium styrene sulfonate with a redox initiator system; then
b. adding to the mixture of step (a) an aqueous dispersion of a first monomer selected from the group consisting of a (meth)acrylate monomer; a styrene monomer; a vinyl ester monomer; a combination of (meth)acrylate and styrene monomers; a combination of (meth)acrylate and vinyl ester monomers; and a combination of vinyl ester and ethylene monomers; and
c. polymerizing the first monomer to form an aqueous dispersion of a first polymer that at least partially encapsulates the $TiO_2$ particles.

In a second aspect, the present invention is a process comprising the steps of:
a. contacting a mixture of i) an aqueous dispersion of $TiO_2$ particles and a polymer formed from the polymerization of methyl methacrylate, butyl acrylate, 2-acrylamido-2-methylpropane sulfonic acid, and dimethylaminoethyl methacrylate; ii) an aqueous solution of sodium dodecylbenzenesulfonate; and iii) an aqueous solution of sodium styrene sulfonate with $Fe^{+2}$; then
b. adding, over time, t-butylhydroperoxide and isoascorbic acid to the mixture of step (a);
c. adding to the mixture of step (b), after the onset of addition of the t-butylhydroperoxide and isoascorbic acid, an aqueous dispersion of:
i) a first monomer selected from the group consisting of butyl acrylate and methyl methacrylate; and
ii) 0.1 to 2 weight percent of allyl methacrylate;
d. polymerizing the first monomer of step (c) to form an aqueous dispersion of a first polymer that encapsulates the $TiO_2$ particles, which first polymer has a $T_g$ in the range of from $-30°$ C. to $10°$ C.;
e. adding to mixture from step (d) aqueous dispersions of a (meth)acrylate monomer, or a combination of (meth)acrylate and styrene monomers, or a combination of (meth)acrylate and vinyl ester monomers, or a combination of vinyl ester and ethylene monomers;
f. polymerizing the monomers from step (e) to form an aqueous dispersion of a second polymer to increase the spacing between $TiO_2$ particles, wherein the second polymer has a $T_g$ in the range of from $-20°$ C. to $10°$ C.; and
g. neutralizing the mixture from step (f) to form an aqueous dispersion of encapsulated $TiO_2$ particles.

In a third aspect, the present invention is a composition comprising an aqueous dispersion of a polymer encapsulating $TiO_2$ particles wherein the encapsulating polymer has a $T_g$ of not greater than $20°$ C. and is a (meth)acrylate polymer, a styrene-acrylate copolymer, or a vinyl ester-(meth)acrylate copolymer, or a vinyl acetate-ethylene copolymer, or a combination thereof, wherein the encapsulating polymer further contains units of sodium styrene sulfonate.

The present invention addresses a need by providing polymer encapsulated $TiO_2$ particles with low gel that are film-forming at ambient temperatures, especially for coatings applications.

DETAILED DESCRIPTION OF THE INVENTION

The present invention relates to a process comprising the steps of:
a. contacting a mixture of i) an aqueous dispersion of $TiO_2$ particles and an amphoteric polymer; ii) an anionic surfactant; and iii) sodium styrene sulfonate with a redox initiator system; then
b. adding the mixture of step (a) an aqueous dispersion of a first monomer selected from the group consisting of a (meth)acrylate monomer; a styrene monomer; a vinyl ester monomer; a combination of (meth)acrylate and styrene monomers; a combination of (meth)acrylate and vinyl ester monomers; and a combination of vinyl ester and ethylene monomers; and
c. polymerizing the first monomer to form an aqueous dispersion of a first polymer that at least partially encapsulates the $TiO_2$ particles.

In the first step of the process of the present invention, an aqueous dispersion of $TiO_2$ and an amphoteric polymer, which adsorbs to the surface of the $TiO_2$ particles, are contacted with an anionic surfactant and sodium styrene sulfonate, preferably, a solution of sodium styrene sulfonate. As used herein, the term "amphoteric polymer" refers to a polymeric dispersant for $TiO_2$ particles that contains amine functionality and acid functionality, preferably a polymer that is prepared from the copolymerization of an ethylenically unsaturated amine functional monomer and an ethylenically unsaturated sulfur-acid functional monomer. Examples of suitable ethylenically unsaturated amine functional monomers include dimethylamino ethyl(meth)acrylate, dimethylamino propyl(meth)acrylamide, and t-butylamino ethyl (meth)acrylate, with dimethylamino ethyl(meth)acrylate being preferred. Examples of suitable ethylenically unsaturated sulfur-acid functional monomers include sulfoethyl (meth)acrylate, sulfopropyl (meth)acrylate, styrene sulfonic acid, vinyl sulfonic acid, and 2-(meth)acrylamido-2-methyl propanesulfonic acid, and salts thereof, with 2-(meth)acrylamido-2-methyl propanesulfonic acid and sulfoethyl methacrylate being preferred. As used herein, the term "(meth) acrylate" refers to either acrylate or methacrylate; the term "(meth)acrylic" refers to acrylic or methacrylic; and the term "(meth)acrylamide" refers to acrylamide or methacrylamide.

In addition to containing amine and sulfur acid functionality, the amphoteric polymer may additionally include functional groups arising from the compolymerization of water-soluble monomers such as hydroxyethyl(meth)acrylate, (meth)acrylamide, or (meth)acrylic acid, or combinations thereof.

The dispersion of $TiO_2$ and the amphoteric polymer are advantageously prepared by slowly adding, with concomitant grinding, the $TiO_2$ to an aqueous dispersion of the amphoteric polymer. The preferred solids content of the $TiO_2$/amphoteric polymer dispersion is in the range of 70 to 80 weight percent based on the weight of $TiO_2$, amphoteric polymer, and water.

The $TiO_2$/amphoteric polymer dispersion is added to a vessel and contacted with a) an anionic surfactant such as those well known in the art, preferably mixed with water; and b) preferably a solution of sodium styrene sulfonate, more preferably as a 5 to 20 weight percent solution based on the weight of water and sodium styrene sulfonate.

In a second step, a redox initiator system is contacted with the mixture to initiate polymerization. As used herein, the term "redox initiator system" refers to a combination of a reducing agent, an oxidizing agent, and a metal ion catalyst. Examples of suitable oxidizing agents include persulfates such as ammonium and alkali metal persulfates; hydroperoxides, such as t-butyl hydroperoxide and cumene hydroperoxide; peroxides such as benzoyl peroxide, caprylyl peroxide, and di-t-butyl peroxide; peresters such as t-butyl peracetate, t-butyl perphthalate, and t-butyl perbenzoate; percarbonates; and perphosphates; with t-butyl hydroperoxide being preferred.

Examples of suitable reducing agents include ascorbic acid, isoascorbic acid, malic acid, glycolic acid, oxalic acid, lactic acid, and thioglycolic acid; an alkali metal hydrosulfite such as sodium hydrosulfite; a hyposulfite such as potassium hyposulfite; or a metabisulfite such as potassium metabisulfite; and sodium formaldehyde sulfoxylate.

Suitable accelerators include halide and sulfate salts of cobalt, iron, nickel, and copper, used in small amounts. An example of a preferred redox initiator system is t-butyl hydroperoxide/isoascorbic acid/$Fe^{+2}$. Preferably, the accelerator is added prior to the addition of the oxidizing and reducing agents. It is further preferred that the oxidizing and reducing agents are added over time to maintain a relatively even level of radical flux over the course of the addition of monomers.

A critical aspect of the process of the present invention is combining the sodium styrene sulfonate with the $TiO_2$/amphoteric polymer dispersion before adding redox initiator system and monomer. This order of addition allows for the opportunity for advantageous adherence of polymerized sodium styrene sulfonate to the $TiO_2$ particles before onset of polymerization of the first monomers. Though not bound by theory, it is believed that this early stage adhesion is responsible for increased stability of $TiO_2$ particles, thereby resulting in a decrease in the formation of process gel.

Preferably, the waiting period between the onset of addition of reducing agent and oxidizing agent of the redox initiator system and the first monomer is in the range of from 30 seconds to about 10 minutes, more preferably from 1 minute to 5 minutes.

In the step following the addition of redox initiator, a first monomer is advantageously added as an aqueous dispersion with a surfactant, preferably sodium dodecylbenzene sulfonate or dodecyl allyl sulfosuccinate. It is understood that the term "a first monomer" is used to refer to one or more monomers; similarly, "an aqueous dispersion refers to one or more aqueous dispersions; thus, a (meth)acrylate monomer refers to one or more (meth)acrylate monomers. The first monomer is preferably either a) a (meth)acrylate monomer; or b) (meth)acrylate and styrene monomers; or c) (meth)acrylate and vinyl acetate monomers; or d) vinyl acetate and ethylene monomers.

For coatings applications, it is desirable to prepare encapsulating polymers that are film-forming at ambient temperatures; that is to say, the nature and relative concentrations of monomers are selected to yield first polymers having a $T_g$ of preferably not more than 20° C., more preferably not more than 10° C., and most preferably not more than 0° C.; and preferably not less not less than −40° C., and more preferably not less than −30° C., as determined by Fox equation. (See *Bulletin of the American Physical Society* 1, 3 Page 123 (1956)). One of ordinary skill in the art would be able to prepare polymers at a desired $T_g$.

Examples of suitable (meth)acrylate monomers include methyl (meth)acrylate, ethyl (meth)acrylate, and butyl (meth)acrylate and combinations thereof. For coatings applications, preferred (meth)acrylate monomers are combinations of butyl acrylate/methyl methacrylate; ethyl hexyl acrylate/methyl methacrylate; and butyl acrylate/ethyl hexyl acrylate/methyl methacrylate.

The first monomer may also include a vinyl ester or a combination of vinyl ester and acrylate monomers, or a combination of vinyl ester and ethylene monomers. A preferred vinyl ester is vinyl acetate; for coatings applications, a combination of vinyl acetate and butyl acrylate or a combination of vinyl acetate, butyl acrylate, and a vinyl ester of a branched carboxylic acid monomer characterized by the following formula may be used:

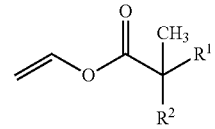

where $R^1$ and $R^2$ are each independently $C_1$-$C_{10}$-alkyl.

Examples of suitable vinyl esters of branched carboxylic acid monomers are the vinyl ester of neodecanoic acid (commercially available as VeoVa 10 monomer) and the vinyl ester of neononanoic acid (commercially available as VeoVa 9 monomer). When vinyl acetate or vinyl acetate and an acrylate monomer are used, it is preferred to include from 0.1 to 1 weight percent 2-acrylamido-2-methylpropane-sulfonic acid (AMPS).

Finally, the first monomer may also a combination of styrene and an acrylate monomer such as butyl acrylate, ethyl acrylate, and 2-ethyl hexyl acrylate or combinations thereof.

The first monomers may also include a crosslinking monomer, which, at low levels, has been found to improve the hiding efficiency of the encapsulated particles. The crosslinking monomer is preferably a multiethylenically unsaturated crosslinking monomer, more preferably a diethylenically unsaturated monomer, used at a level sufficient to form a polymer that is resistant to deformation, preferably in the range of from 0.05 to 3 weight percent. A preferred crosslinking monomer is allyl methacrylate used at a concentration of from 0.1 to 2 weight percent, based on the weight of total first monomers.

The ethylenically unsaturated first monomers may further include one or more acid functionalized monomers, preferably carboxylic acid functionalized monomers such as (meth)acrylic acid or itaconic acid in the range of from 0.5 to 3 weight percent, based on the weight of total monomers.

In a next step, the first monomers are polymerized under polymerization conditions, preferably, at a starting temperature in the range of from 20° C. to 75° C. to form a first stage polymer having the desired $T_g$. It has surprisingly been discovered that useful polymers can be prepared without an additional external heating source.

Subsequent to the first stage polymerization, it may be desirable to carry out a second stage polymerization step by adding second monomers to the vessel, followed by polymerization to form a second stage polymer, which, for coatings applications, preferably has a $T_g$ of less than 20° C., preferably less than 10° C., and more preferably less than 0° C. and preferably not less not less than –40° C., and more preferably not less than –30° C. The monomers suitable for this second stage polymerization step are selected from the same group as the first stage monomers except that second stage monomers preferably contains no crosslinking monomer; it is further preferred that the second stage polymer have a $T_g$ not greater than the $T_g$ of the first stage polymer.

It is understood that the monomer used in this second stage may be the same as or different from the monomer used in the first stage polymerization. For example, the first stage monomer may be an all (meth)acrylic monomer system while the second stage may be an all (meth)acrylic monomer system or a styrene-acrylic system.

Subsequent to the final polymerization step (that is, after the first polymerization step for a one-stage encapsulating polymer or after the second polymerization step for a two-stage encapsulating polymer), the mixture is advantageously neutralized with a suitable base. The resultant formulation is a dispersion of $TiO_2$ particles at least partially encapsulated with sodium styrene sulfonate polymer and any or all of the (meth)acrylate, styrene, vinyl ester, (meth)acrylate-styrene, (meth)acrylate-vinyl ester, and ethylene-vinyl ester based polymers. As used herein, the term "at least partially encapsulated" means that at least part of the surface of $TiO_2$ is in contact with the polymer or polymers as determined by scanning electron microscopy. It is preferred that the $TiO_2$ particles be completely encapsulated by polymer.

In a two-stage polymer, the second stage polymer at least partially encapsulates the first polymer-encapsulated $TiO_2$ particles. In a more preferred two-stage embodiment, the first stage polymer totally encapsulates the $TiO_2$ particles and the second stage polymer totally encapsulates the first stage polymer. The process of the present invention prepares polymer encapsulated $TiO_2$ particles in a manner that has been found to increase spacing of the particles, thereby improving hiding efficiency, particularly where the first stage polymer contains low levels of crosslinking agent.

The advantage of $TiO_2$ particles encapsulated with one or more polymers having $T_g$ of not greater than 20° C. is that the use of such ambient temperature film forming particles gives lower pigment volume content (PVC) than particles containing a high $T_g$ (not less than 40° C.) polymer phase. Consequently, formulators would have more latitude in their ability to decrease the level of high $T_g$ and high cost binder in favor of higher concentrations of low-cost extender.

Although low $T_g$ first and second polymers are desirable for coatings applications, it may be desirable to prepare high $T_g$ polymers for plastics applications. Thus, in another embodiment of the present invention, the nature and concentration of monomers is designed to produce a relatively high $T_g$ first and/or second polymer phase, preferably a low $T_g$ first polymer phase ($T_g$=–30° C. to 20° C.) and high $T_g$ second polymer phase ($T_g$=40° C. to 120° C.).

In another embodiment, the present invention is a composition comprising an aqueous dispersion of a polymer encapsulating $TiO_2$ particles wherein the encapsulating polymer has a $T_g$ of not greater than 20° C. and is a (meth)acrylate polymer, a styrene-acrylate copolymer, or a vinyl ester-(meth)acrylate copolymer, a vinyl ester-ethylene copolymer, or a combination thereof, wherein the encapsulating polymer further contains units of sodium styrene sulfonate. As used herein, the term "units of sodium styrene sulfonate" refer to the following groups:

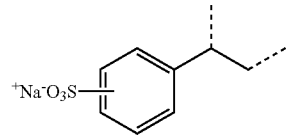

where the dotted lines represent the points of attachment to the polymer backbone.

EXAMPLES

The following examples are for illustrative purposes only and are not intended to limit the scope of the invention. The $TiO_2$/amphoteric polymer slurry for Examples 1 and 2 and Comparative Example 1 was prepared essentially as described in US Pat. Pub. 20100/298483, Example 1 (para 0052) and Example 4 (para 0058); the slurry prepared for Examples 3, 4, and 5 and Comparative Examples 2 and 3 were prepared essentially described in Example 2 (para 0053) and Example 5 (para 0059).

Abbreviations

SDS=Sodium dodecylbenzene sulfonate (23%) BMA=Butyl methacrylate
SSS=Sodium styrene sulfonate BA=Butyl acrylate
t-BHP=t-Butyl hydroperoxide MMA=Methyl methacrylate
EDTA=Ethylene diamine tetraacetic acid MAA=Glacial methacrylic acid
IAA=Isoascorbic acid ALMA=Allyl methacrylate
AMPS=2-acrylamido-2-methylpropane-sulfonic acid DI water=Deionized water
VA=vinyl acetate Example 1

Preparation of BA/MMA Polymer-Encapsulated Pigment Particles, High Temp

To a 500 mL four-necked round bottom flask equipped with paddle stirrer, $N_2$-inlet, reflux condenser, heating mantel, and thermocouple was charged $TiO_2$-amphoteric polymer slurry (197.3 g, 73% solids) along with a solution of SDS (1.5 g) mixed in DI water (10 g) and a separate solution of SSS (1.2 g in 10 g DI water). The flask was purged with $N_2$, and heated to 50° C., at which time aqueous solutions of 0.1% iron sulfate (4.0 g) and 1% EDTA (0.4 g) were combined and added to the flask. Two minutes later, co-feed #1 (1.6 g t-BHP dissolved in 25 g DI water) and co-feed #2 (0.9 g IAA dissolved in 25 g DI water) were fed to the flask at a rate of 0.25 g/min Two minutes after the onset of the co-feed solution addition, a monomer emulsion (ME) prepared by mixing DI water (25.0 g), SDS (3.0 g), BA (68.0 g), and MMA (46.0 g) was fed to the reactor at a rate of 2.0 g/min at a temperature of 50° C. When the ME addition was complete, the co-feed #1 and #2 additions were continued for another 20 min until completion. The contents of the reactor were then cooled to room temperature after which time aqua ammonia (3.0 g, 14%) was added. The contents of the reactor were then filtered to remove any gel. The filtered dispersion was found to have a solids content of 61.7% with 0.01 g (~23 ppm) of dry gel removed. The polymer had a $T_g$ of $-8°$ C., as calculated by the Fox equation.

Comparative Example 1

To a 500-mL four-necked round bottom flask equipped with paddle stirrer, $N_2$-inlet, reflux condenser, heating mantel, and thermocouple was charged with $TiO_2$-amphoteric polymer slurry (197.3 g, 73.0% solids) along with a solution of SDS (1.5 g in 20 g DI water). The flask was purged with $N_2$, and heated to 50° C., at which time aqueous solutions of 0.1% iron sulfate (4.0 g) and 1% EDTA (0.4 g) were combined and added to the flask. Two minutes later co-feed #1 (1.6 g t-BHP dissolved in 25 g DI water) and co-feed #2 (0.9 g IAA dissolved in 25 g DI water) were fed to the reactor at a rate of 0.25 g/min Two minutes after the onset of the co-feed solution addition, a monomer emulsion (ME) prepared previously by mixing DI water (25.0 g), SDS (3.0 g), BA (68.0 g), SSS (1.2 g), and MMA (46.0 g) was fed to the reactor at a rate of 2.0 g/min at a temperature of 50° C. Within ten minutes from the start of the ME addition, the batch became very viscous because of high gel formation. The batch was aborted. The polymer had a $T_g$ of $-8°$ C., as calculated by the Fox equation.

Example 2

Formation of BA/MMA Polymer-Encapsulated Pigment Particles, Room Temp

To a 500 mL four-necked round bottom flask equipped with paddle stirrer, $N_2$-inlet, reflux condenser, heating mantel, and thermocouple was charged $TiO_2$-amphoteric polymer slurry (197.3 g, 73% solids) along with a solution of SDS (1.5 g) mixed in DI water (10 g) and a separate solution of SSS (1.2 g in 10 g DI water). The flask was purged with $N_2$, and the temperature adjusted to 25° C., at which time aqueous solutions of 0.1% iron sulfate (4.0 g) and 1% EDTA (0.4 g) were combined added to the flask. Two minutes later co-feed #1 (1.6 g t-BHP dissolved in 25 g DI water) and co-feed #2 (0.9 g IAA dissolved in 25 g DI water) were fed to the reactor at a rate of 0.25 g/min Two minutes after the onset of the co-feed solution addition, a monomer emulsion (ME) prepared by mixing DI water (25.0 g), SDS (3.0 g), BA (68.0 g), and MMA (46.0 g) was fed to the reactor at a rate of 2.0 g/min. The ME addition produced an exotherm that increased the reactor temperature 50° C. When the ME addition was complete, the co-feed #1 and #2 additions were continued for another 20 min until completion. The contents of the reactor were then cooled to room temperature after which time aqua ammonia (3 g, 14%) was added. The contents of the reactor were then filtered to remove any gel. The filtered dispersion had a solids content of 61.0% with 0.01 g (~23 ppm) of dry gel removed. The polymer had a $T_g$ of $-8°$ C., as calculated by the Fox equation.

Example 3

Formation of Vinyl/Acrylic Polymer-Encapsulated Pigment Particles, Room Temp

To a 500 mL four-necked round bottom flask equipped with paddle stirrer, $N_2$-inlet, reflux condenser, heating mantel, and thermocouple was charged $TiO_2$-amphoteric polymer slurry (197.3 g, 73% solids) along with a solution of SDS (1.5 g) mixed in DI water (10 g) and a separate solution of SSS (0.6 g in 10 g DI water). The flask was purged with $N_2$, and the temperature adjusted to 25° C., at which time aqueous solutions of 0.1% iron sulfate (4.0 g) and 1% EDTA (0.4 g) were combined and added to the flask. Two minutes later co-feed #1 (1.6 g t-BHP dissolved in 25 g DI water) and co-feed #2 (0.9 g IAA dissolved in 25 g DI water) were fed to the reactor at a rate of 0.25 g/min. Two minutes after the onset of the co-feed solution addition, a monomer emulsion (ME) prepared previously by mixing DI water (25.0 g), SDS (3.0 g), Disponil Fes-77 emulsifier (3.8 g), Emcol K8300 emulsifier (0.6 g), BA (38.76 g), VA (74.67 g), and AMPS monomer (1.14 g) was fed to the reactor at a rate of 2.0 g/min. The ME addition produced an exotherm that increased the reactor temperature 68° C. When the ME addition was complete, the co-feed #1 and #2 additions were continued for another 20 min until completion. The contents of the reactor were then cooled to room temperature and the contents filtered to remove any gel. The filtered dispersion was found to have a solids content of 61.8% with 0.02 g (~47 ppm) of dry gel removed. The polymer had a $T_g$ of $-5°$ C., as calculated by the Fox equation.

Comparative Example 2

To a 500-mL four neck round bottom flask equipped with paddle stirrer, $N_2$-inlet, reflux condenser, heating mantel, and thermocouple was charged $TiO_2$-amphoteric polymer slurry (197.3 g, 73% solids) along with a solution of SDS (1.5 g) mixed in DI water (20 g). The flask was purged with $N_2$, and the temperature adjusted to 25° C., at which time aqueous solutions of 0.1% iron sulfate (4.0 g) and 1% EDTA (0.4 g) were combined and added to the flask. Two minutes later co-feed #1 (1.6 g t-BHP dissolved in 25 g DI water) and co-feed #2 (0.9 g IAA dissolved in 25 g DI water) were fed to the reactor at a rate of 0.25 g/min Two minutes after the onset of the co-feed solution addition, a monomer emulsion (ME) prepared previously by mixing DI water (25 g), SSS (0.6 g), SDS (3.0 g), Disponil Fes-77 emulsifier (3.8 g), Emcol K8300 emulsifier (0.6 g), BA (38.76), VA (74.67), and AMPS monomer (1.14 g) was fed to the reactor at a rate of 2.0 g/min. The ME addition produced an exotherm that increased the reactor temperature; within 10 min from the start of ME addition, with the temperature at ~30° C., the batch became very viscous due to excessive gel formation. The batch was aborted. The polymer had a $T_g$ of $-8°$ C., as calculated by the Fox equation.

Example 4

Formation of 2-Stage Polymer-Encapsulated Pigment Particles, High Temp

To a 500-mL four-necked round bottom flask equipped with paddle stirrer, $N_2$-inlet, reflux condenser, heating mantel, and thermocouple was charged $TiO_2$-amphoteric polymer slurry (197.3 g, 73% solids) along with a solution of SDS (1.5 g) mixed in DI water (10 g) and a separate solution of SSS (1.2 g in 10 g DI water). The flask was purged with $N_2$, and the temperature adjusted to 50° C., at which time aqueous solutions of 0.1% iron sulfate (4.0 g) and 1% EDTA (0.4 g) were combined and added to the flask. Two minutes later co-feed #1 (1.6 g t-BHP dissolved in 25 g DI water) and co-feed #2 (0.9 g IAA dissolved in 25 g DI water) were fed to the reactor at a rate of 0.25 g/min. Two minutes after the onset of the co-feed solution addition, a first monomer emulsion (ME 1) prepared by mixing water (6.0 g DI), SDS (1.3 g), BA (17.1 g), MMA (11.1 g), MAA (0.30 g), and ALMA (0.14 g) was added at a rate of 2.0 g/min. After the completion of ME 1 addition, a second monomer emulsion (ME 2), prepared by mixing DI water (19.0 g), SDS (5.0 g), BA (51.0 g), styrene (33.3 g), and MAA (0.90 g) was fed to the reactor at a rate of 2.0 g/min at 50° C. When ME 2 addition was complete, the co-feed #1 and #2 additions were continued for another 20 min until completion. The contents of the reactor were then cooled to room temperature and aqua ammonia (1 g, 28%) was added. The contents of the reactor were then filtered to remove any gel. The filtered dispersion had a solids content of 59.1% with 0.01 g (~20 ppm) of dry gel removed. The first stage polymer had a $T_g$ of −9° C. and the second stage polymer had a $T_g$ of −10° C., as calculated by the Fox equation.

Comparative Example 3

To a 500-mL four-necked round bottom flask equipped with paddle stirrer, $N_2$-inlet, reflux condenser, heating mantel, and thermocouple was charged $TiO_2$-amphoteric polymer slurry (197.3 g, 73% solids) along with a solution of SDS (1.5 g) mixed in DI water (20 g). The flask was purged with $N_2$, and the temperature adjusted to 50° C., at which time aqueous solutions of 0.1% iron sulfate (4.0 g) and 1% EDTA (0.4 g) were combined and added to the flask. Two minutes later co-feed #1 (1.6 g t-BHP dissolved in 25 g DI water) and co-feed #2 (0.9 g IAA dissolved in 25 g DI water) were fed to the reactor at a rate of 0.25 g/min. Two minutes after the onset of the co-feed solution addition, monomer emulsion #1 (ME 1) prepared by mixing DI water (6.0 g), SDS (1.3 g), SSS (0.30 g), BA (17.1 g), MMA (11.1 g), MAA (0.30 g), and ALMA (0.14 g) was added at a rate of 2.0 g/min. When ME 1 addition was complete, a second monomer emulsion (ME 2) prepared by mixing DI water (19.0 g), SDS (5.0 g), SSS (0.9 g), BA (51.0 g), styrene (33.3 g), and MAA (0.90 g) was fed to the flask at a rate of 2.0 g/min at 50° C. When ME 2 addition was complete, the co-feed #1 and #2 additions were continued for another 20 min until completion. A substantial amount of coagulum was observed on the thermocouple and sides of the kettle. The contents of the reactor were cooled to room temperature and aqua ammonia (1 g, 28%) was added to the kettle. The contents of the reactor could not be filtered because of the massive amount of gel that clogged the filter screen. The first stage polymer had a $T_g$ of −9° C. and the second stage polymer had a $T_g$ of −10° C., as calculated by the Fox equation.

Example 5

Formation of High $T_g$ Polymer-Encapsulated Pigment Particles

To a 5000-mL, four necked round bottom flask equipped with paddle stirrer, thermometer, $N_2$-inlet, and reflux condenser, was charged $TiO_2$-amphoteric polymer slurry (197.3 g, 73% solids) along with a solution of SDS (15.6 g) mixed in DI water (100 g) and a separate solution of SSS (11.5 g in 100 g DI water). The flask was purged with $N_2$, and the temperature adjusted to 50° C., at which time aqueous solutions of 0.1% iron sulfate (40.0 g) and 1% EDTA (4.0 g) were combined and added to the flask. Two minutes later, co-feed #1 (16.2 g t-BHP dissolved in 250 g DI water) and co-feed #2 (9.1 g IAA dissolved in 250 g DI water) were fed to the flask at a rate of 2.5 g/min. Two minutes after the onset of the co-feed solution addition, a first monomer emulsion (ME 1) prepared by mixing DI water (60.0 g), SDS (7.4 g), BA (168.1 g), MMA (112.6 g), MAA (2.8 g), and ALMA (1.5 g) was fed to the reactor at a rate of 20.0 g/min at a temperature of 50° C. After the completion of ME 1 addition, a second monomer emulsion (ME 2), prepared by mixing DI water (160.0 g), SDS (37.0 g), BMA (71.3 g), MMA (605.6 g), and MAA (35.6 g) was fed to the reactor at a rate of 20.0 g/min at 50° C. The temperature of the reaction reached 58° C. during the course of the ME 2 addition. When ME 2 was complete, the co-feed #1 and #2 additions were continued for another 20 min until completion. The contents of the reactor were then cooled to room temperature and aqua ammonia (10.0 g, 28%) was added. The contents of the flask were then filtered to remove any gel. The filtered dispersion had a solids content of 60.5% with 0.1 grams (~29 ppm) of dry gel removed. The first stage polymer had a $T_g$ of −8° C. and the second stage polymer had a $T_g$ of ~100° C., as calculated by the Fox equation.

We claim:

1. A process comprising the steps of:
   a. contacting a mixture of i) an aqueous dispersion of $TiO_2$ particles and an amphoteric polymer; ii) an anionic surfactant; and iii) sodium styrene sulfonate with a redox initiator system; then
   b. adding to the mixture of step (a) an aqueous dispersion of a first monomer selected from the group consisting of a (meth)acrylate monomer; a styrene monomer; a vinyl ester; a combination of (meth)acrylate and styrene monomers; a combination of (meth)acrylate and vinyl acetate monomers; and a combination of vinyl ester and ethylene monomers; and
   c. polymerizing the first monomer to form an aqueous dispersion of a first polymer that at least partially encapsulates the $TiO_2$ particles.

2. The process of claim 1 wherein which further comprises, after step (c), the steps of:
   d. adding to the mixture an aqueous dispersion of a second monomer selected from the group consisting of a (meth)acrylate monomer; a combination of (meth)acrylate and styrene monomers; a combination of (meth)acrylate and a vinyl ester monomers; and a combination of vinyl ester and ethylene monomers;
   e. polymerizing the second monomer to form an aqueous dispersion of a second polymer that at least partially encapsulates the first polymer.

3. The process of claim 2 wherein the first monomer addition step further includes the addition of 0.05 to 3 weight percent of a diethylenically unsaturated crosslinking agent based on the total weight of first monomers, and wherein the second monomer addition step excludes a crosslinking agent.

4. The process of claim 1 wherein redox initiator system is $Fe^{+2}$, t-butylhydroperoxide, and isoascorbic acid; and wherein the amphoteric polymer is prepared by polymerizing methyl methacrylate, butyl acrylate, 2-acrylamido-2-methylpropane sulfonic acid, and dimethylaminoethyl methacrylate.

5. The process of claim 1 wherein the first polymer is a copolymer of a) butyl acrylate or ethyl hexyl acrylate or a combination thereof; b) methyl methacrylate; and c) allyl methacrylate; which copolymer has a $T_g$ of from −30° C. to 10° C., wherein the concentration of allyl methacrylate is from 0.1 to 2 weight percent based on the total weight of first monomers.

6. The process of claim 1 wherein the first polymer is a copolymer of a) butyl acrylate or a vinyl ester of a branched carboxylic acid monomer, or a combination thereof; b) vinyl acetate; and c) 0.1 to 1 weight 2-acrylamido-2-methylpropane-sulfonic acid, which copolymer has a $T_g$ of from −30° C. to 10° C., wherein the vinyl ester of a branched carboxylic acid monomer is characterized by the following formula:

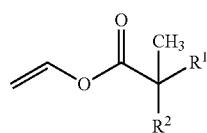

wherein $R^1$ and $R^2$ are each independently $C_1$-$C_{10}$-alkyl groups.

7. The process of claim 1 wherein the first polymer is a copolymer of butyl acrylate, styrene, and allyl methacrylate, which copolymer has a $T_g$ of from −30° C. to 10° C., wherein the concentration of allyl methacrylate is from 0.1 to 2 weight percent based on the total weight of first monomers.

8. The process of claim 2 wherein the second polymer is a copolymer of butyl methacrylate, methyl methacrylate, and methacrylic acid, which copolymer has a $T_g$ in the range of from 40° C. to 120° C.

9. The process of claim 1 wherein the first monomer or second monomer or both further include from 0.5 to 5 weight percent acrylic acid or methacrylic acid based on the weight of total monomers.

10. The process of claim 1 which further includes, after the final polymerization step, the step of neutralization with a base.

11. A process comprising the steps of:
a. contacting a mixture of i) an aqueous dispersion of $TiO_2$ particles and a polymer formed from the polymerization of methyl methacrylate, butyl acrylate, 2-acrylamido-2-methylpropane sulfonic acid, and dimethylaminoethyl methacrylate; ii) an aqueous solution of sodium dodecylbenzenesulfonate; and iii) an aqueous solution of sodium styrene sulfonate with $Fe^{+2}$; then
b. adding, over time, t-butylhydroperoxide and isoascorbic acid to the mixture of step (a);
c. adding to the mixture of step (b), after the onset of addition of the t-butylhydroperoxide and isoascorbic acid, an aqueous dispersion of:
  i) a first monomer selected from the group consisting of butyl acrylate and methyl methacrylate; and
  ii) 0.1 to 2 weight percent of allyl methacrylate;
d. polymerizing the first monomer of step (c) to form an aqueous dispersion of a first polymer that encapsulates the $TiO_2$ particles, which first polymer has a $T_g$ in the range of from −30° C. to 10° C.;
e. adding to mixture from step (d) aqueous dispersions of a (meth)acrylate monomer or a combination of (meth)acrylate and styrene monomers or a combination of (meth)acrylate and vinyl acetate monomers;
f. polymerizing the monomers from step (e) to form an aqueous dispersion of a second polymer to increase the spacing between $TiO_2$ particles, wherein the second polymer has a $T_g$ in the range of from −30° C. to 10° C.; and
g. neutralizing the mixture from step (f) to form an aqueous dispersion of encapsulated $TiO_2$ particles.

* * * * *